United States Patent [19]

Friedrich

[11] 4,266,629
[45] May 12, 1981

[54] MOTOR VEHICLE WITH AXLE PIVOT STEERING

[75] Inventor: Karl Friedrich, Sipplingen, Fed. Rep. of Germany

[73] Assignee: Kramer-Werke GmbH, Uberlingen, Fed. Rep. of Germany

[21] Appl. No.: 28,437

[22] Filed: Apr. 9, 1979

[51] Int. Cl.³ .............................................. B62D 25/08
[52] U.S. Cl. .................................. 180/252; 180/312; 280/800
[58] Field of Search ............... 180/232, 291, 311, 312, 180/252; 280/800, 799, 798

[56] References Cited

U.S. PATENT DOCUMENTS

| | | | |
|---|---|---|---|
| 2,603,506 | 7/1952 | Johnson | 280/800 X |
| 3,970,162 | 7/1976 | Salver et al. | 180/291 |
| 4,173,264 | 11/1979 | Erker et al. | 280/800 X |

Primary Examiner—John J. Love
Assistant Examiner—Michael Mar
Attorney, Agent, or Firm—Toren, McGeady and Stanger

[57] ABSTRACT

A motor vehicle with axle pivot steering includes a rigid axle and a steering axle having swivelling wheels. The vehicle frame is made up of a first and a second frame portion each having longitudinally extending beams interconnected by transverse beams. First frame portion extends forwardly of the second frame portion and forms the front end of the frame. The second frame portion extends rearwardly of the first frame portion and forms the rear end of the frame. The longitudinal beams of the first frame portion are located inwardly of the longitudinal beams of the second frame portion and support the rigid axle and the steering axle. The rigid axle is located forwardly of the steering axle. The longitudinal beams in the front portion of the frame are at a level permitting easy access to the driver's seat. Toward the steering axle the longitudinal beams of the second frame portion extend upwardly above the longitudinal beams of the first frame portion over the swivelling wheels forming an arch-like portal so that these wheels can be turned without interference.

6 Claims, 6 Drawing Figures

MOTOR VEHICLE WITH AXLE PIVOT STEERING

SUMMARY OF THE INVENTION

The present invention is directed to a motor vehicle with axle pivot steering or Ackermann steering and includes a vehicle frame made up of a first and a second portion each having longitudinally extending beams. Certain of the longitudinally extending beams extend upwardly over the swivelling wheels of the vehicle and form an arch-like portal so that the wheels can be turned without interference. Such a vehicle can be used for cross-country driving, for construction work or for transporting loads. It is important for such vehicles to be able to effect a small turning circle or, as a prerequisite for such movement, to have a wide steering turn of the wheels.

With regard to steering, a distinction is made between vehicles steered by an articulated frame and vehicles having axle pivot steering. If the steering is provided by an articulated frame, the vehicle frame is divided into a front and a rear frame portion which pivot relative to one another in the manner of a hinge. Such a steering arrangement has inherent dangers and disadvantages regarding the stability of the vehicle, the stability of the frame, the design of the driver's seat, and the structural size and the structural height of the vehicle, particularly if this type of steering is used in a smaller cross-country vehicle.

Known vehicles which employ axle pivot steering also have difficulties with respect to a maximum steering turn, since the swivel range of the swivelling wheels is limited by the vehicle frame. The swivelling wheels may be the front wheels or the rear wheels, such as in front end loaders, or the front and rear wheels may be the swivelling wheels. If in a vehicle with axle pivot steering the maximum swivelling angle of the wheels is to be increased, either the track width of the steering axle must be increased and this is generally not possible, since the available structural width is already utilized, or the frame between the wheels must be made narrower which causes difficulties in the stability and the arrangement of the parts supported on the vehicle frame, particularly the engine. Alternatively, the frame must be raised above the level of the swivelling wheels and such a possibility leads to disadvantages in the arrangement of the driver's seat, since the driver's seat would be very high and reachable only via a ladder and would be considerably separated from any working area at ground level. Furthermore, the structural height of the vehicle in such a design is bothersome in many respects.

Therefore, it is the primary object of the present invention, to provide a motor vehicle having axle pivot steering with the ability to effect a maximum steering turn without encountering the difficulties concerning stability, construction and design of the driver's seat experienced in the past.

In accordance with the present invention, a motor vehicle utilizing axle pivot steering includes a frame divided into two portions. A first frame portion is positioned at a low height as is conventional in the state of the art and affords easy access to the driver's seat which is arranged at a low height. A second frame portion is coextensive with and extends at the same height of the first frame portion, however, in the region of the swivelling wheels, the second frame portion extends upwardly over the wheels and provides an arch-like portal. Since the part of the second frame portion rearwardly of the steering wheels extends downwardly to the same height as the first frame portion, it provides fastening possibilities on the frame at the height of the first frame portion. Because of this division of the frame, the swivelling range of the swivelling wheels on the steering axis can be easily increased, since the possibility is removed of the frame interfering with the turning of the wheels. Further, the longitudinal beams of the first frame portion can be located closer together than those of the second frame portion providing support for the steering axle while avoiding interference with the swivelling wheels. As a result, the first frame portion affords an "inner frame" which can be kept very narrow without causing any problems concerning stability or without resulting in any significant limitations on engine suspension, because the inner frame does not have to extend for the entire vehicle length. Further, if there is no danger of twisting, the "inner frame" can be constructed from a single longitudinal beam while the second frame portion forms an "outer frame". The second or "outer" frame portion is capable of supporting various parts of the vehicle and also makes it possible to effect connections at optimum locations as well as permitting the utilization of the full vehicle width. This arrangement of the frame, in accordance with the present invention, assures that the stability of the entire vehicle and the stability of the frame are excellent. Advantageously, the steering axle as well as the rigid axle can be supported by the first or "inner" frame portion without any constructional difficulties in the region of the swivelling wheels. Further, the engine can be supported on two sides without being laterally enclosed by the frame. Though the first frame portion in the region of the steering axle and the engine tend to limit the turning of the swivelling wheels, such limitation is not significant as would be the case if the longitudinal beam of the frame extended between the engine and the edge of the swivelling wheels.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments.

DETAIL DESCRIPTION OF THE INVENTION

Figure 1:
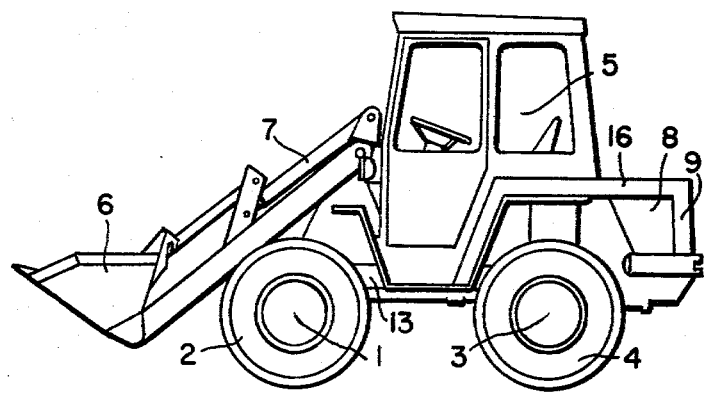
FIG. 1 is a side view of a motor vehicle, such as a front end loader, embodying the present invention.
Figure 2:
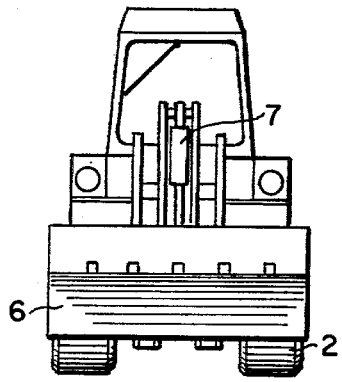
FIG. 2 is a front view of the motor vehicle shown in FIG. 1.

The motor vehicle illustrated in FIGS. 1 and 2 is a universal working machine which may be equipped particularly for use as a front end loader, however, it can also be used as a forklift, an excavator, a snow plow and as many other types of such a machine. As viewed in FIG. 1 the left-hand end of the vehicle is its front end and the right-hand end is its rear end. The vehicle has a rigid front axle 1 with two non-swivelling front wheels 2 and a rear sterring axle 3 with two swivelling rear wheels 4. The orientation of the axles designated as "front" and "rear" relates to the position of a driver's seat 5 within the cab of the vehicle body. Mounted on the front of the vehicle is a loading shovel 6 operated by a hydraulic installation 7. In the rear portion 8 of the vehicle, between the steering axle 3 and the rear end 9 of the vehicle, is a motor 10, such as an internal combustion engine, note FIGS. 4 and 5.

Figure 3:
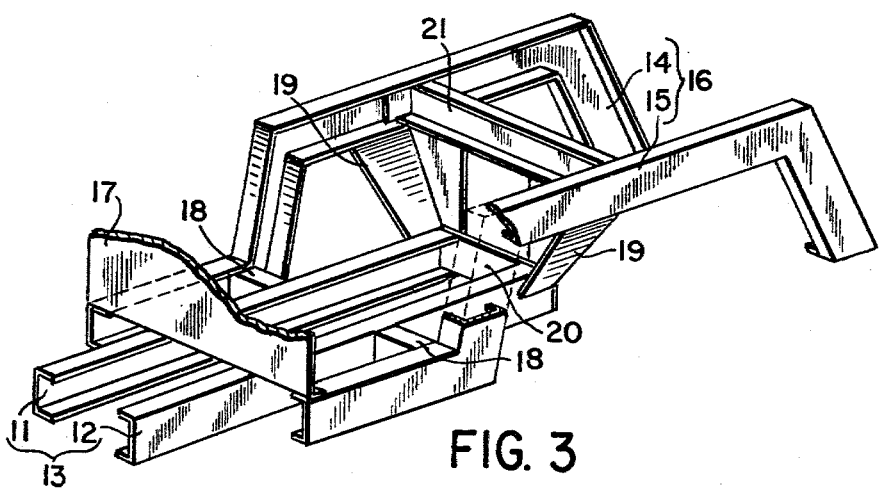
FIG. 3 is an enlarged perspective view of the frame of the motor vehicle.

The supporting structure for the vehicle is provided by a frame illustrated in FIG. 3. The frame is made up of a first frame portion 13 consisting of two inner longitudinal beams 11 and 12, and a second frame portion 16 formed of two outer longitudinal beams 14, 15. Longitudinal beams 11, 12 of the first frame portion 13 are rectilinear steel section beams, while the longitudinal beams 14, 15 of the second frame portion 16 are made up of a plurality of steel section beams angularly disposed relative to one another and welded together at several locations. Within each frame portion, the longitudinal beams 11, 12 and 14, 15 are interconnected by transverse cross beams and, in addition, cross beams extend between the longitudinal beams in each of the frame portions. For instance, a cross beam 17 is located at the front ends of the longitudinal beams 14 and 15 and extends over the longitudinal beams 11 and 12 and also provides additional connection locations for the vehicle. Further, two small cross beams 18 extend between adjacent ones of the longitudinal beams in the first and second frame portions. Cross beams 19 extend upwardly from the rearward ends of the longitudinal beams 11, 12 to the upper portions of the longitudinal beams 14, 15 of the second frame portion. Another cross beam 20 extends across the rear ends of the longitudinal beams 11, 12 and, in addition, provides a support for the engine. Finally, cross beam 21 interconnects the upper portions of the longitudinal beams 14, 15.

Figure 4:
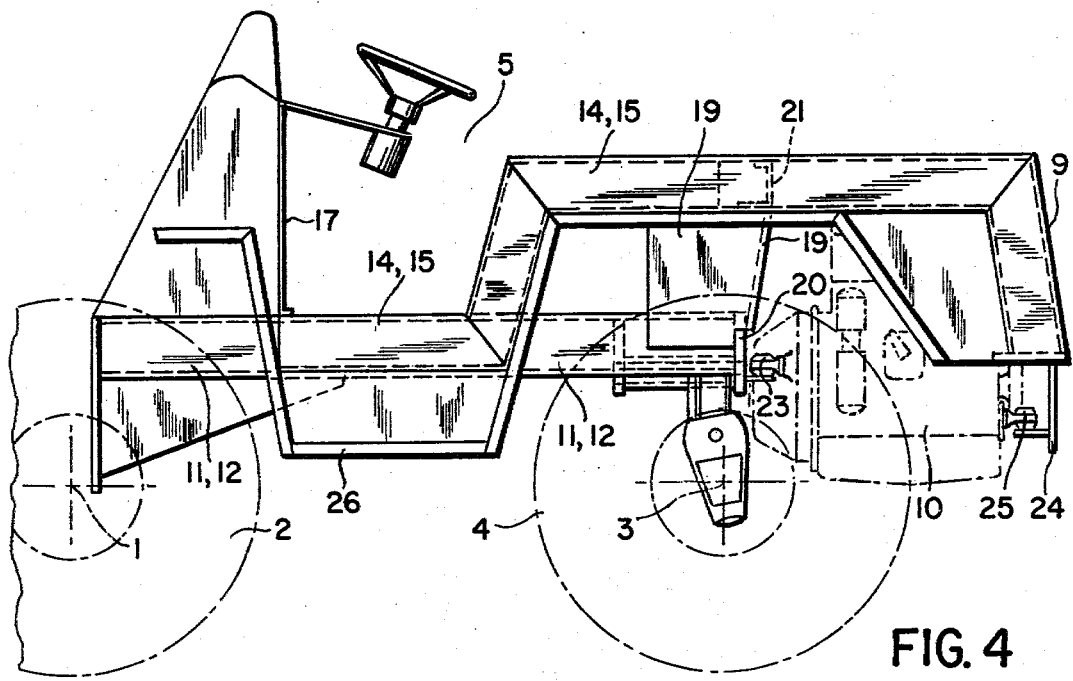
FIG. 4 is a schematic side view of parts of the vehicle shown in FIG. 1 and includes the vehicle frame.
Figure 6:
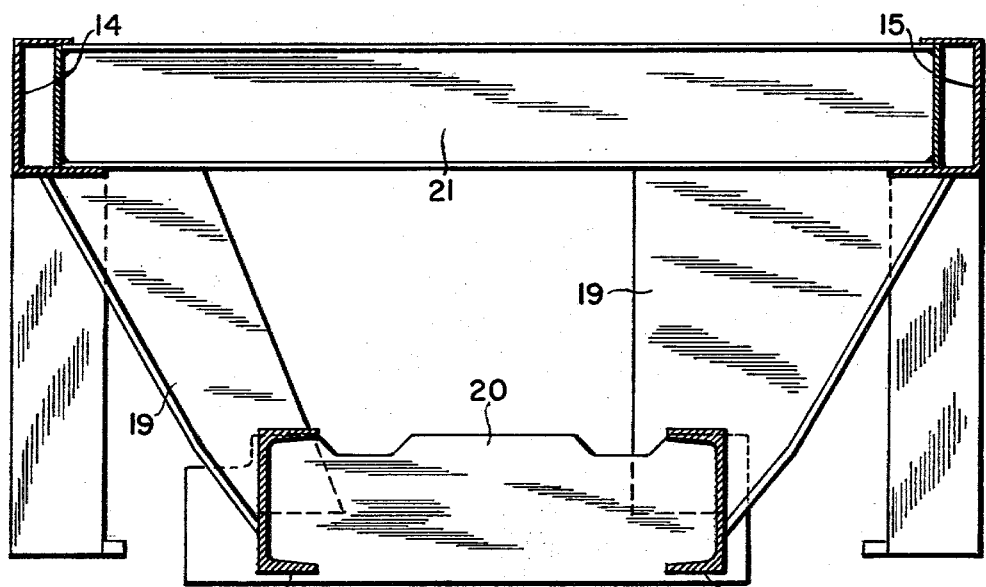
FIG. 6 is a sectional view along the line VI—VI in FIG. 5.
Figure 5:
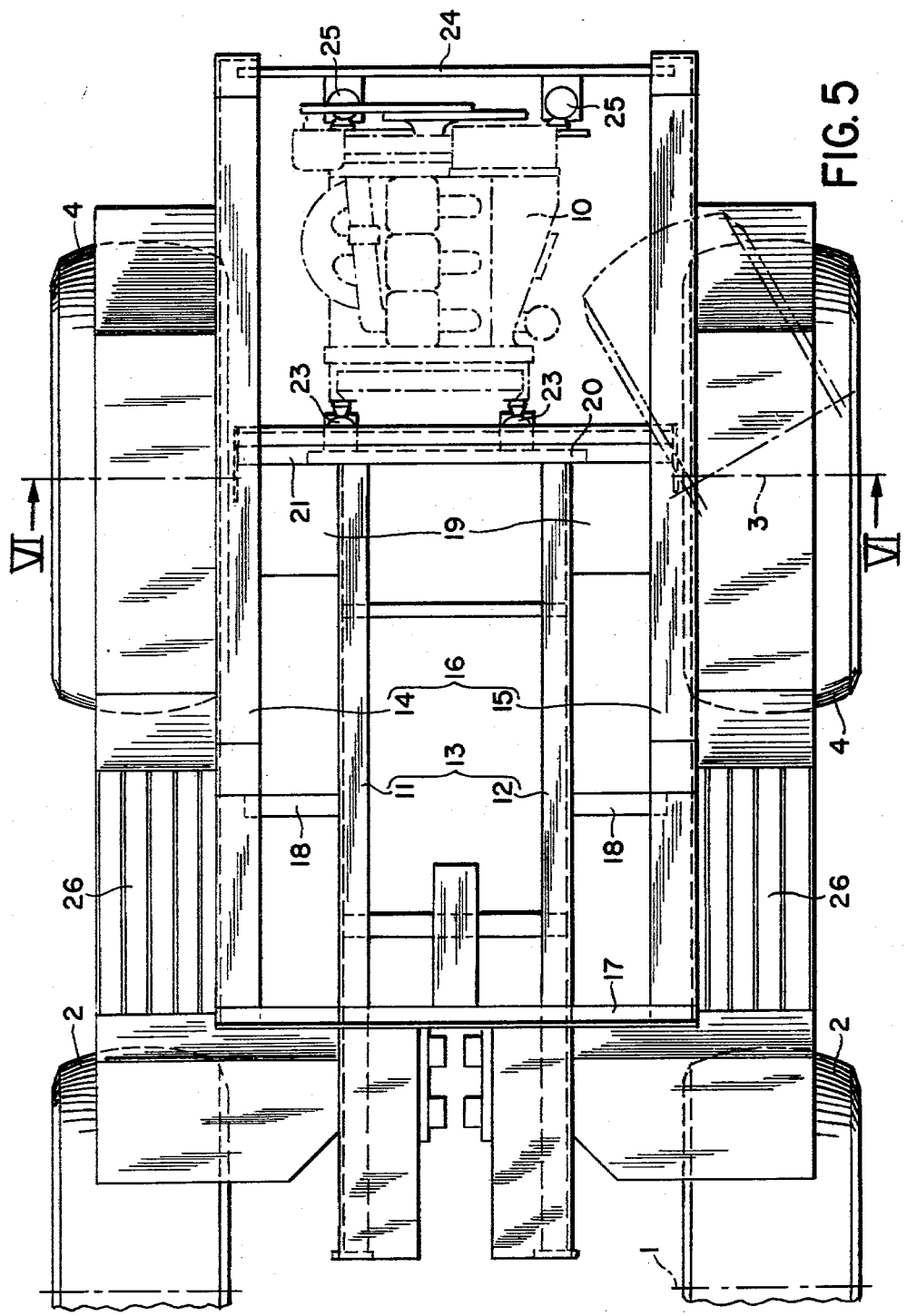
FIG. 5 is a top view of the parts illustrated in FIG. 4.

As illustrated in FIGS. 4 and 5, the steering axle 3 with the rear swivelling wheels 4 is fastened to the rear ends of the longitudinal beams 11, 12 of the first frame portion 13.

The swivelling wheels 4 are connected in a conventional manner through steering knuckles to the steering axle 3. Wheels 4 can be turned by means of tie rods or hydraulic steering control, not shown. In addition, rigid front axle 1 is connected to the longitudinal beams 11, 12. Accordingly, the fastening base for these axles corresponds to the distance between the longitudinal beams 11, 12 which extend parallel to one another and are rather close together. As can be seen in FIG. 5, the longitudinal beams 14, 15 of the second frame portion 16 are much further apart than the longitudinal beams 11, 12 and are located above the wheels 4. In FIG. 4 it can be noted that in the region of the swivelling wheels 4 the longitudinal beams 14, 15 are arranged in the form of an arch-like portal so that the steering axle can swing fully through the opening provided by the portal and there is no limitation or interference provided by these beams in the turning path of the wheels. The turning angle of the wheels is shown in dashed lines in FIG. 5. Furthermore, FIG. 5 shows that the wheels can be turned significantly closer to the engine 10 than would be the case if the engine was laterally enclosed by rearward extensions of the longitudinal beams 11, 12.

As can be seen in FIGS. 4 and 5, the engine is supported at its front end on the first frame portion 13 and at its rear end on the second frame portion 16. Accordingly, engine supports 23 are located at the rear ends of the longitudinal beams 11, 12 while similar engine supports 25 are mounted on a cross beam 24 extending between the rearward ends of the longitudinal beams 14, 15. The engine 10 is mounted between the supports 23 and 25. Therefore, at the rear end 9 of the vehicle, the engine 10 is supported by the downwardly extending parts of the arch-like portal formed by the longitudinal beams 14, 15. Additional devices can be attached to the frame and connecting points can be provided at the rear end 9 of the vehicle without extending the longitudinal beams 11 and 12 of the first frame portion 13 which supports the axles at the opposite ends of the frame portion.

The first and second frame portions 13, 16 are illustrated in FIG. 1. In the region of the driver's seat 5, the longitudinal beams of both frame portions are located at the same height and are parallel to one another. In this part of the vehicle, on both of its sides, foot supports 26 are located which permit convenient access to the driver's seat which, as a result, is located at a relatively low height, since it is not above the motor.

The construction embodying the present invention makes it possible to construct vehicles which are easy to maneuver and which have outside dimensions which are quite small. Moreover, such vehicles have a very high stability and compact design while also being low in weight and having a small turning circle.

While specific embodiments of the invention have been shown and described in detail to illustrate the application of the inventive principles, it will be understood that the invention may be embodied otherwise without departing from such principles.

What is claimed is:

1. Motor vehicle with axle pivot steering comprising a rigid frame having a front end and a rear end with a longitudinal direction extending in the front end-rear end direction and a transverse direction extending across the longitudinal direction, at least two vehicle axles supported on and extending in the transverse direction of said frame with at least one of said axles comprising a steering axle having swivelling wheels thereon, an engine mounted on said frame, a vehicle body including a driver's seat mounted on said frame, said frame including first beams extending in the longitudinal direction of said frame and second beams extending in the transverse direction of said frame, and said vehicle body having an access to the driver's seat over said first beams, wherein the improvement comprises that said frame includes at least two frame portions each extending in the longitudinal direction and comprising a first frame portion and a second frame portion, said first and second frame portions each comprising said second beams and different ones of said first beams, said first beams of said first frame portion having an upper height lower than the upper height of said swivelling wheels and defining the lower height limit of the access in said vehicle body to the driver's seat, and said first beams of said second frame portion each having a arched section extending upwardly over the upper height of said swivelling wheels and forming an arch-like portion for said swivelling wheels so that said swivelling wheels can be swivelled without contacting said first beams of said second frame portion, said first beams of said first and second frame portions extend in generally parallel spaced relation with said first beams of said first frame portion located closer together than said first beams of said second frame portion and said first beams of said first frame portion arranged symmetrically between said first beams of said second frame portion, and said second beams of said first frame portion are rigidly connected to said first beams thereof and said second beams of said second frame portion are rigidly connected to said first beams thereof and wherein said steering axle is supported on said first beams of said first frame portion and is spaced below said first beams of said second frame portion.

2. Motor vehicle, as set forth in claim 1, wherein said first beams of said first and second frame portions are coextensive for at least a part of the longitudinal dimension of said frame so that said first and second frame portions overlap and extend between said vehicle axles.

3. Motor vehicle, as set forth in claim 2, wherein said second frame portion extends in the longitudinal direction rearwardly from the rear end of said first frame portion.

4. Motor vehicle, as set forth in claim 3, wherein said first frame portion extends in the longitudinal direction forwardly of the front end of said second frame portion.

5. Motor vehicle with axle pivot steering comprising a rigid frame having a front end and a rear end with a longitudinal direction extending in the front end-rear end direction and a transverse direction extending across the longitudinal direction, at least two vehicle axles supported on and extending in the transverse direction of said frame with at least one of said axles comprising a steering axle having swivelling wheels thereon, an engine mounted on said frame, a vehicle body including a driver's seat mounted on said frame, said frame including first beams extending in the longitudinal direction of said frame and second beams extending in the transverse direction of said frame, and said vehicle body having an access to the driver's seat over said first beams, wherein the improvement comprises that said frame includes at least two frame portions each extending in the longitudinal direction and comprising a first frame portion and a second frame portion, said first and second frame portions each comprising said second beams and different ones of said first beams, said first beams of said first frame portion having an upper height lower than the upper height of said swivelling wheels and defining the lower height limit of the access in said vehicle body to the driver's seat, and said first beams of said second frame portion each having an arched section extending upwardly over the upper height of said swivelling wheels and forming an arch-like portion for said swivelling wheels so that said swivelling wheels can be swivelled without contacting said first beams of said second frame portion, said engine is located between said steering axle and the adjacent end of said frame, said first beams of said second frame portion projecting further from said steering axle to the adjacent end of said frame than said first beams of said first frame portion so that the ends of said first beams of said first frame portion and the ends of said first beams of said second frame portion are spaced apart in the longitudinal direction of said frame, engine supports secured on the ends of said first beams of said first and second frame portions, and said engine mounted on said engine supports so that the engine is located between the adjacent ends of said first and second frame portions.

6. Motor vehicle with axle pivot steering comprising a rigid frame having a front end and a rear end with a longitudinal direction extending in the front end-rear end direction and a transverse direction extending across the longitudinal direction, at least two vehicle axles supported on and extending in the transverse direction of said frame with at least one of said axles comprising a steering axle having swivelling wheels thereon, an engine mounted on said frame, a vehicle body including a driver's seat mounted on said frame, said frame including first beams extending in the longitudinal direction of said frame and second beams extending in the transverse direction of said frame, and said vehicle body having an access to the driver's seat over said first beams, wherein the improvement comprises that said frame includes at least two frame portions each extending in the longitudinal direction and comprising a first frame portion and a second frame portion, said first and second frame portions each comprising said second beams and different ones of said first beams, said first beams of said first frame portion having an upper height lower than the upper height of said swivelling wheels and defining the lower height limit of the access in said vehicle body to the driver's seat, and said first beams of said second frame portion each having an arched section extending upwardly over the upper height of said swivelling wheels and forming an arch-like portal for said swivelling wheels so that said swivelling wheels can be swivelled without contacting said first beams of said second frame portion, the front ends of said first beams of said first frame portion form the front end of said frame and front end of said first beams of said second frame portion are spaced rearwardly from the front end of said frame, the rear end of said first beams of said second frame portion form the rear end of said frame and the rear end of said first beams of said first frame portion are spaced forwardly from the rear end of said frame, said vehicle axles comprising a front axle and a rear axle, said front axle is a rigid axle and said steering axle forms said rear axle, said first beams of said first and second frame portions being co-extensive at the same height rearwardly of said front axle and forwardly of said rear axle, said first beams of said second frame portion being disposed angularly to the co-extensive portion of said first beams and extending upwardly to a height over the height of said steering wheels, and the remainder of said first beams of said second frame portion extending rearwardly from the angularly upwardly extending part over said steering wheels and then extending angularly downwardly rearwardly of said steering wheels.

* * * * *